Figure 1:
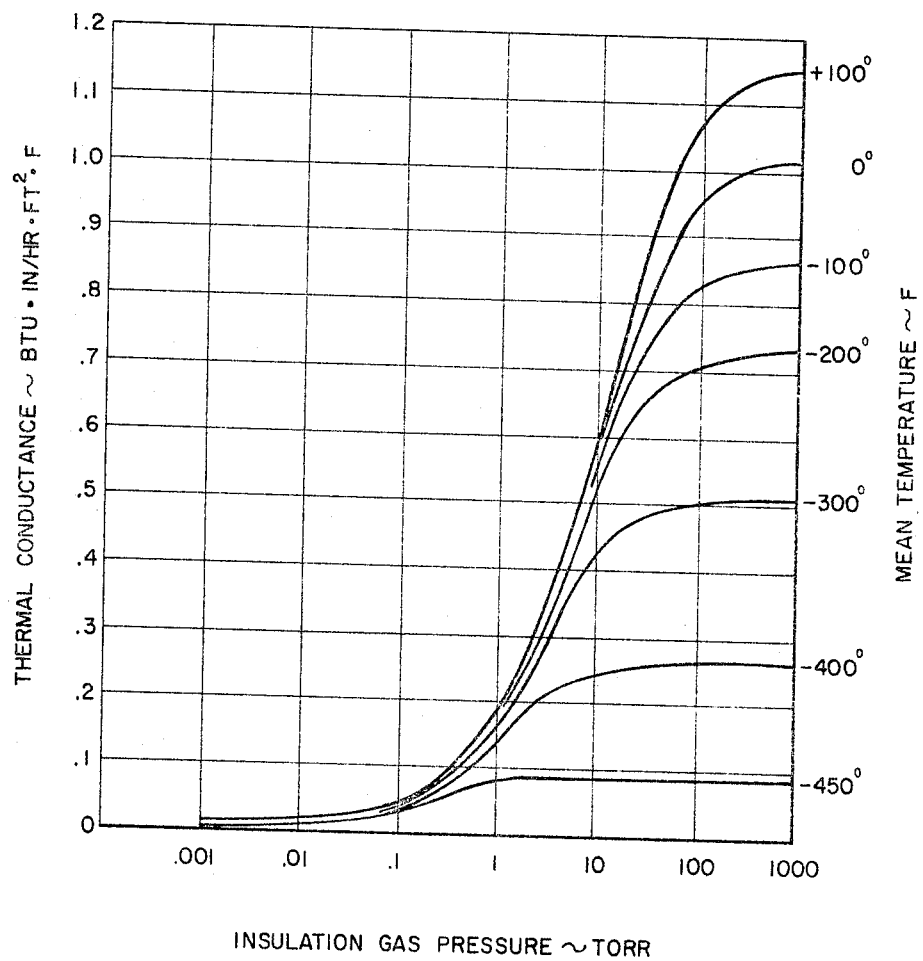

Sept. 6, 1966    J. G. LINDBERG    3,270,802
METHOD AND APPARATUS FOR VARYING THERMAL CONDUCTIVITY
Filed Jan. 10, 1963                                4 Sheets-Sheet 2

INVENTOR.
JAY G. LINDBERG
BY
ATTORNEY

Sept. 6, 1966  J. G. LINDBERG  3,270,802
METHOD AND APPARATUS FOR VARYING THERMAL CONDUCTIVITY
Filed Jan. 10, 1963
4 Sheets-Sheet 4

INVENTOR.
JAY G. LINDBERG
BY *allan Rothenberg*
ATTORNEY

3,270,802
METHOD AND APPARATUS FOR VARYING THERMAL CONDUCTIVITY
Jay G. Lindberg, Downey, Calif., granted to National Aeronautics and Space Administration under the provisions of 42 U.S.C. 2457(a)
Filed Jan. 10, 1963, Ser. No. 250,567
8 Claims. (Cl. 165—2)

This invention relates to method and apparatus for controlling heat flow and particularly concerns adjustment of thermal conductance. The methods and apparatus of this invention are useful for regulating temperature.

The control of temperature of apparatus is a problem of great importance in many fields of technology today. Temperature is usually controlled by the addition or subtraction of heat in a system whose heat transfer characteristics with its environment are substantially uniform. Thus, for example, the temperature of electronic components operating in a temperature above ambient is controlled by providing a path for heat transfer from the electronic components to the enviroment wherein the rate of heat transfer is higher than the maximum rate of heat generation in the components, sensing the temperature of the components, and adding heat to the system by an electric heater in order to counter-balance the excess heat loss to the environment. By controllably varying the quantity of heat added to such a system in equilibrium with its surroundings, its temperature can be controlled.

It has also been a common practice to provide heat transfer between two regions at different temperatures wherein the rate of heat transfer is a predetermined quantity. Thus, for a first example, high rates of heat transfer are provided in many types of equipment to minimize the temperature gradient between the equipment and its environment. As a second example, insulation to minimize the quantity of heat transferred is often interposed between regions at different temperatures to maximize the difference in temperature between the two regions. Thus, the rate of heat transfer is maximized or minimized in any particular example to an extent that is compatible with the other physical properties required of the heat transfer system. The heat transfer rate is controlled to the extent that it is fixed at a predetermined value by means of selecting the geometry and physical properties of the heat transfer medium. In static heat transfer mediums such as thermal insulation, the total thermal conductance of the materials employed is relatively constant.

The problem of controlling the temperature of electronic components in orbiting or other vehicles in space is more difficult of solution than similar problems in terrestrial enviroments. Heat is generated by the operation of electronic equipment and in order to prevent excessive temperature rise in the apparatus this heat must be removed from the electronic components. This heat can be dissipated only by means of radiation into space or by heating an expendable refrigerant or heat sink. The available solutions to the problem of dissipating heat have been limited to relatively small stabilized vehicles wherein the heat load from the operating devices aboard the vehicle is relatively constant with time. The sophisticated systems previously available have been unsatisfactory because of the prohibitively large weight or size of the system, the complex instrumentation, the requirement of excessive amounts of electrical energy to operate the system, the limited lifetime of the components of the system, or the complexity and multiple opportunities for malfunction of the system.

It is therefore a broad object of this invention to provide a method and apparatus for regulating heat flow or temperature in a manner which substantially obviates the disadvantages described above.

Thus in the practice of this invention according to a preferred embodiment there is provided a method and apparatus for regulating heat flow including the interposition of a gas-filled permeable insulation material between the apparatus the temperature of which is to be controlled, and the environment. Heat is transferred from the apparatus through the insulation material to the environment. The rate of heat flow is controlled by varying the thermal conductance of the insulating material. As illustrated herein the thermal conductance of the insulating material is varied by means of the pressure of the gas amid the insulation material. Pressure is regulated in response to the pressure of the gas amid the permeable insulating material to provide a closed-loop pressure control or feedback.

As an apparatus and method for regulating temperature this invention provides a means for sensing a temperature linked to the heat flow. The temperature of apparatus is sensed and the pressure of the gas in the insulation is biased in response to the temperature sensed. The preferred embodiment also comprises a pressure regulator that is responsive to the pressure of the gas in the insulating material and the temperature in the apparatus. This arrangement provides a closed-loop temperature regulator involving a pressure sensitive variable thermal conductance in the control loop, as well as a closed-loop pressure control.

The illustrated structure of the preferred embodiment for carrying out the principles of this invention includes a body of gas-filled permeable insulating material interposed between an apparatus and its environment. A source of higher pressure gas and a valve in communication with and between the higher pressure gas and the insulating material are provided. A sump of lower pressure gas or vacuum and a second valve communicating with and between the vacuum and the gas amid the insulating material is also included. A pressure responsive element such as a resilient diaphragm provides alternative selective actuation for each of the aforementioned valves. The resilient diaphragm is in communication with and is sensitive to the pressure of the gas amid the thermal insulation material. A thermal actuator such as a temperature actuated change of state device senses the temperature of the apparatus. The thermal actuator is connected to bias the operation of the pressure responsive member. In the preferred embodiment an increase in temperature sensed by the thermal actuator above a predetermined value causes an increase in the pressure of the gas amid the permeable insulating material thereby increasing the thermal conductance of the insulating material. Increase in the thermal conductance of the insulating material likewise increases the rate of heat flow through the insulating material.

Thus it will be seen that dual feedback loops are provided. A first closed control loop involves sensing a quantity linked to the heat flow to effect variation of a pressure that controls the rate of the heat flow. The second closed control loop involves feedback control of the variable pressure itself. The two control loops are combined in the preferred embodiment in the operation of a unique pressure and temperature operated control valve.

A second embodiment illustrates the bidirectional control of thermal conductance by varying the composition of the gas amid the thermal insulating material.

Thus it is a broad object of this invention to provide a new and improved method and apparatus for the regulation of heat flow.

It is an object of this invention to provide a structure and method for regulating temperature in an apparatus.

It is a further object of this invention to provide a method and apparatus for controllably varying the thermal conductance of a thermal insulator.

It is another object of this invention to vary pressure as a function of temperature.

It is still another object of this invention to control temperature by means of pressure control.

It is a further object of this invention to provide a pressure regulating valve responsive to temperature.

Figure 2:
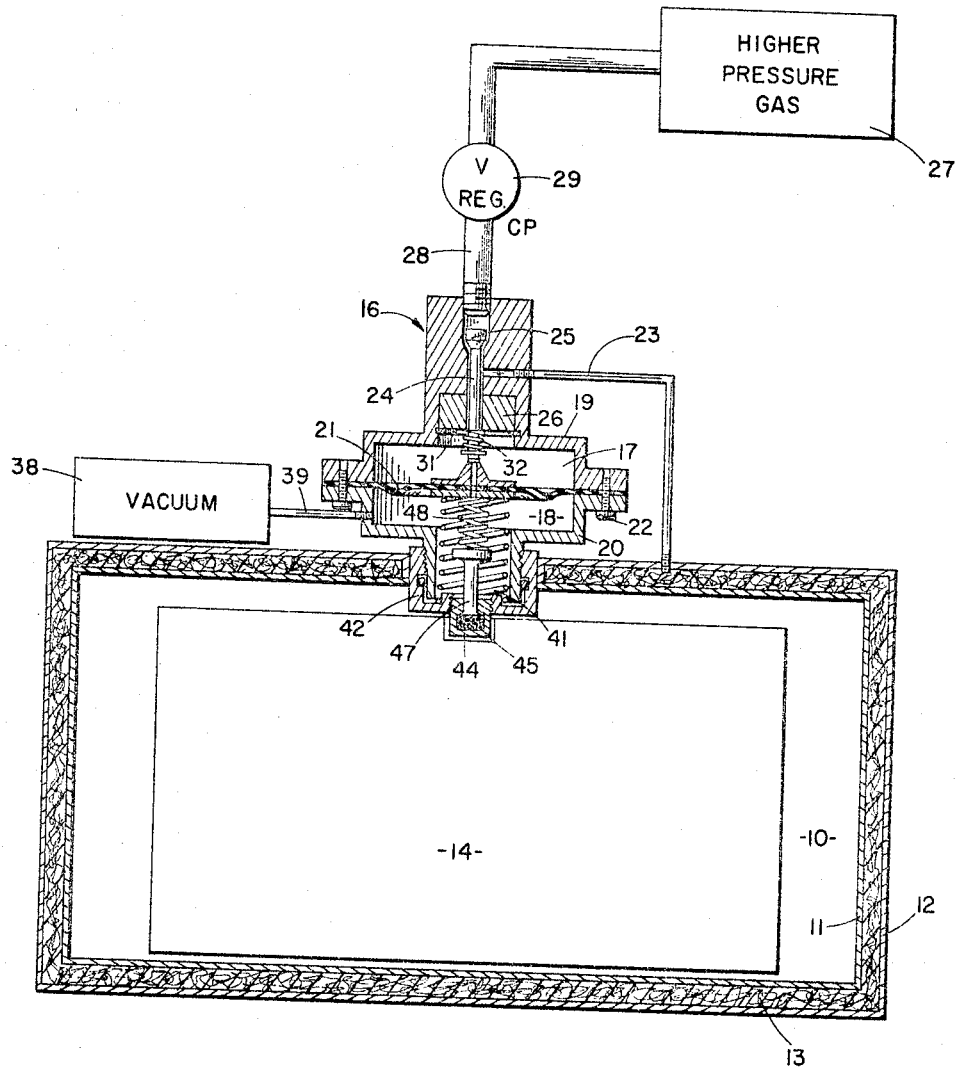
Figure 3:
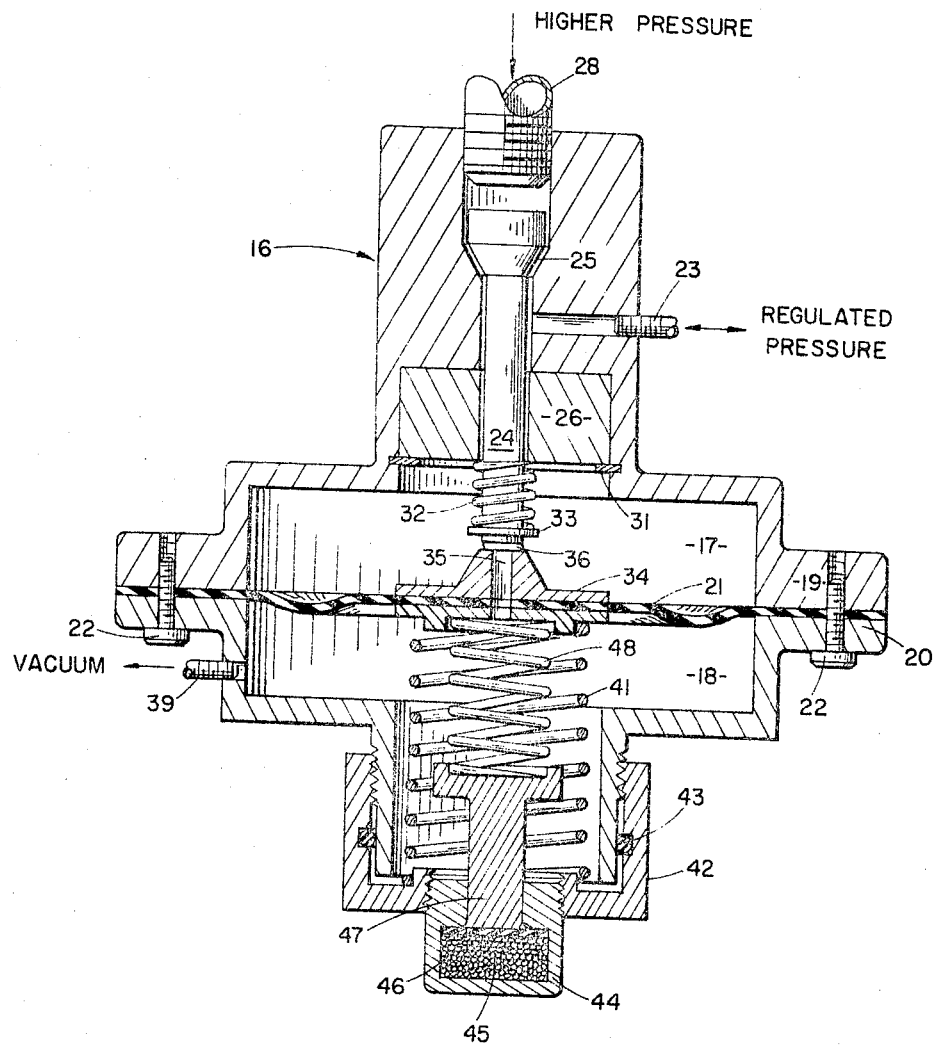
Figure 4:
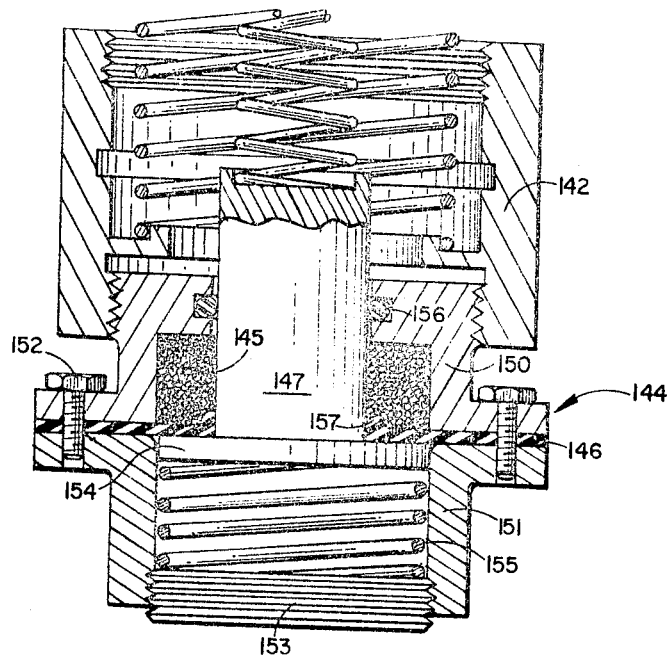
Figure 5:
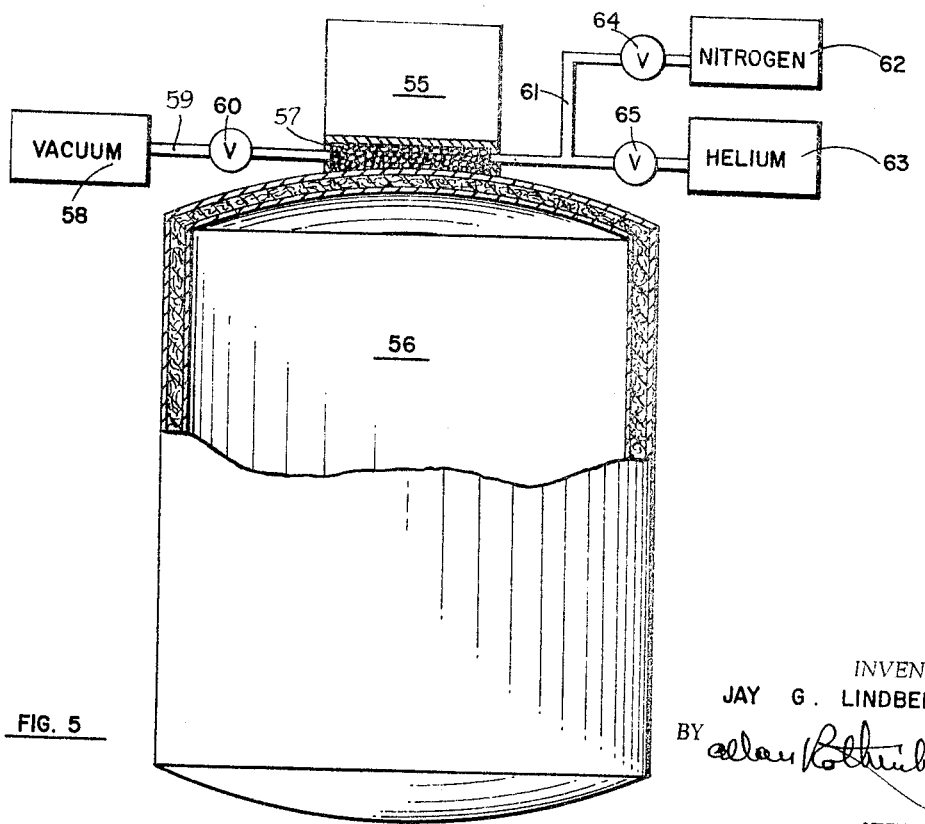

Other objects and many of the attendant advantages of this invention will be readily appreciated as the same becomes better understood by reference to the following detailed description when considered in connection with the accompanying drawings wherein:

FIG. 1 is a graph showing an exemplary variation of thermal conductance as a function of the pressure of a gas in a gas-filled permeable insulating material, FIG. 2 illustrates a heat flow apparatus embodying the principles of this invention, FIG. 3 is a sectional view showing in more detail the control valve of FIG. 2, FIG. 4 is a sectional view of a second embodiment of the adjustable cap of the valve of FIG. 3, and FIG. 5 illustrates another heat flow apparatus embodying the principles of this invention.

Throughout the drawings like numerals refer to like parts.

The term thermal conductance as used in relation to the drawings and the description refers to a composite of the heat transfer characteristics of a material and is a physical property characteristic of the insulating material mentioned herein. The insulation or insulating material considered herein is a permeable solid substance containing a gas amid the solid substance. The thermal conductance is, therefore, a composite of the factors effecting a heat transfer by means of thermal conduction through the solid substance in the permeable insulation, conduction through the gas in the interstices of the solid substance, convection of the gas in the interstices and radiation from one portion of the solid substance to another. The thermal conductance of a permeable insulating material is dependent on the composition and geometry of the solid substance in the permeable insulation material, the composition of the gas amid the solid substance, the mean temperature of the insulating material, and the pressure of the gas in the interstices of the solid substance.

When a permeable substance is packed into a space to provide a body of insulating material, it assumes a particular apparent density of solid material which remains substantially constant during the life of the insulation. The initial packing results in a certain constant degree of contact between the individual particles, fibers, cells, or other forms of the solid substance so that the thermal conduction through the solid portion of the insulating material remains substantially constant. The initial packing of the solid substance also determines the size and geometry of the interstices amid the solid substance. Thus the individual path lengths for gas conduction and the degree of constraint of convection of the gas in the interstices is fixed. The original packing determines the length and path of the radiation heat transfer from individual areas of the solid substance to other areas of the solid. The relative importance of solid conduction, gas conduction, convection and radiation as heat transfer mechanisms depends on the composition and pressure of the gas in the interstices, the composition and geometry of the solid substance and the temperature at which the heat transfer is conducted.

The result is that at a given pressure the thermal conductance of a given body of insulating material is constant at any chosen mean temperature. However, if the pressure of the gas in the interstices is changed, the quantity of heat that can be transferred by mechanism of gas conduction and convection is changed. Heat transfer by the mechanism of radiation and solid conduction is relatively uneffected by pressure. An exemplary illustration of the variation in thermal conductance that is obtained is in the graph of FIG. 1. The linear ordinate on this graph is the thermal conductance in the units of British Thermal Units-inch per hour-sq. ft.-degree Fahrenheit (B.t.u.-in./hr.-ft.$^2$-F.). The logarithmic abscissa on the graph is the pressure of a gas in a permeable insulating material expressed in the units of millimeters of mercury (1 torr=1 millimeter of mercury).

A family of curves is plotted on the graph of FIG. 1. Each of these curves represents thermal conductance of the insulation as a function of pressure at a particular mean temperature of the insulating material. These temperatures are the mean of the temperatures on the hot and cold sides of the insulation respectively and are indicated in degrees Fahrenheit at the right side of the graph. The particular curves plotted on this graph represent the thermal conductance of an insulating material comprising a matrix of solid glass fibers permeated with helium gas. The glass has a specific gravity of 2.01 and an average filament diameter of about 2.6 microns. The fibrous glass substance is packed to an apparent density of 8.35 lbs. per cubic foot.

The curves presented are for helium in the specified permeable solid substance, however, the shape of the curves in FIG. 1 is typical of the shape of curves that are obtained for other gases permeating the same or other solid substances packed to the same or different densities. These curves show a portion of relatively slight variation in thermal conductance at low gas pressures. The absolute magnitude of the thermal conductance is also very low. At higher pressures a second portion of relatively slight variation in thermal conductance is also present and the absolute magnitude of the thermal conductance in this higher pressure regime is many times greater than the thermal conductance in the first mentioned lower pressure regime. Intermediate between the pressure regimes showing relatively slight changes in thermal conductance is a pressure regime in which the thermal conductance shows a rapid variation as a function of gas pressure. For helium in the specified solid substance the pressure range of relatively rapid variation in thermal conductance for the temperature ranges illustrated lies between about 0.01 torr and 1000 torr.

A change in the composition or geometry of the solid substance, the degree of packing or the composition of the gas (as more fully described hereinafter), will change the magnitude of the thermal conductance of the insulating material. Curves of the thermal conductance of these substituted insulating materials as a function of pressure also include regions of relatively invarient thermal conductance at higher and lower pressures. Likewise a region of relatively rapid rate of change of thermal conductance as a function of pressure is also present at an intermediate pressure range. The pressure range in which the rapid rate of change of thermal conductance occurs will be somewhat, although not substantially, influenced by the nature of the gas and the solid substance. In any of these variants the changed properties have considerably decreased effect when the pressure of the gas amid the permeable substance is lower than about 0.01 torr.

As illustrated in FIG. 1 the thermal conductance versus pressure curves are a function of the mean temperature in the insulation. At extremely low temperatures the effect of pressure on the thermal conductance is less than at higher temperatures. Thus, for example, an increase in pressure from 0.01 torr to 1000 torr at −450° F. yields a tenfold change in thermal conductance. A similar change in pressure of the gas when the insulating material has a mean temperature of 100° F. yields more than a hundredfold increase in thermal conductance. At pressures below 0.01 torr the rate of change of thermal conductance as a function of pressure is so low that further reduction in the pressure is seldom required. Likewise an increase in the pressure of the gas in the insulation above 1000 torr does not yield substantial gains in thermal conductance. It is therefore preferred that the gas pressure in the insulation be maintained within the pressure range of 0.01 torr to 1000 torr.

When thermal conductance of an insulating material is varied, the rate of heat flow through a body of that insulating material will also vary. When such a body is interposed between two regions having two temperatures which are different from each other, heat will flow from the higher temperature region to the lower temperature region, and the quantity of heat that flows between the two regions is determined by the thermal conductance of the body of insulating material. As the conductance is increased the rate of heat flow is increased and as the conductance is decreased the rate of heat flow is decreased. Bidirectional control of the heat flow is obtained by bidirectional control of the thermal conductance.

In any given heat transfer system involving thermal conductance it is usually not convenient to continuously vary the area through which heat is flowing nor the thickness of the body of insulating material. The quantity of heat flowing across a body of insulation is dependent on the temperature gradient across the insulation. Thus, the temperature gradient could be varied to affect the rate of heat flow but this is usually not convenient or may be the very quantity it is desired ultimately to control. Thus, a convenient way to vary the rate of heat flow in a heat transfer system involving thermal conductance is to vary that thermal conductance.

As has been illustrated in FIG. 1 the thermal conductance of a permeable insulating material is varied by means of variation in pressure of a gas amid a solid insulating substance. Bidirectional control of the rate of heat flow is obtained by bidirectional control of the thermal conductance of a body of insulating material and bidirectional control of the thermal conductance is conveniently obtained by bidirectional control of the pressure of a gas amid the insulating material.

In order to provide control it is desirable to provide a control means sensitive to variations in the rate of heat transfer. This control means should respond to variations in the heat transfer rate to controllably vary the pressure of the gas in the insulating material. In mechanizing the sensing of the quantity of heat flowing it is convenient to sense a quantity linked to the rate of heat flow. In the illustrated embodiment hereinafter described the quantity linked to the heat flow is the temperature of an electronic apparatus. Although the temperature of a single portion of the system is sensed in the described embodiment it will be readily appreciated that other quantities related to the heat flow can be sensed and applied within the principles of this invention. Thus, for example, it is contemplated that means can be substituted for sensing the heat flow directly, sensing the temperature of the environment or sensing a mass flow, pressure, density, composition or other parameter linked to the heat flow. The quantity linked to the heat flow can thus be one anticipating the change in rate of heat flow or a quantity that has a changed magnitude as a result of a change in the rate of heat flow. Systems are contemplated which anticipate and minimize changes in the rate of heat flow and systems to restore an apparatus to its original thermal equilibrium after a change in the heat transfer rate.

FIG. 2 illustrates a heat transfer system incorporating the principles of this invention. As illustrated in this embodiment, apparatus is provided separated from its environment by a body of insulating material. The thermal conductance of the insulating body is varied by means of control of pressure of a gas in the insulating material. A diaphragm responsive to the pressure of the gas provides closed-loop pressure control. Means are provided for sensing the temperature of the apparatus and biasing the means responsive to temperature to affect the pressure of the gas in the insulation. Since the temperature of the apparatus is dependent on the heat flow through the insulation which is in turn dependent on the pressure of the gas, closed-loop temperature control is provided.

As illustrated in the embodiment of FIG. 2 there is provided a compartment 10 which is defined and substantially surrounded by a container having an inner wall 11 and an outer wall 12 with a gas-filled permeable insulating material 13 interposed between the two walls. This insulating material comprises as a permeable solid substance a fibrous glass having a specific gravity of 2.01 and an average filament diameter of about 2.6 microns. This fibrous material is packed to an average apparent density of 8.35 lbs. per cubic foot. Although for the purposes of exposition a single type of solid substance is described, it is contemplated that this solid substance can be in any of a variety of forms such as, for example, hollow spheres, small granules, fabrics, foams with interconnected pores, platelets, sheets, or other types of geometries which will form a permeable mass. This substance may also be any of a great variety of materials which can be selected by one skilled in the art such as, for example, ceramics, metals, plastics such as polyurethane or phenolic resins, cork or animal or vegetable fibers. The solid substance need not contribute to the structural strength of the walls but may so contribute without departing from the principles of this invention.

The insulating material also comprises helium gas amid the permeable solid substance and confined thereto by the walls 11 and 12. Helium is preferred as the gas in the interstices of the solid substance because of its combination of high heat transfer rate, low weight and complete safety. Although a preferred material is involved in this embodiment, it will readily be appreciated that the principles of this invention incorporate the application of any gas for use in the insulation.

The compartment 10 contains, for example, an electronic computer 14 the temperature of which it is desired to control. The operating characteristics of the computer vary considerably if it is used outside of a relatively narrow temperature range. In this embodiment it is desired to operate the computer in the temperature range of 100° to 140° F. During the operation of the computer, heat is generated due to electric current flowing in the computer. The quantity of heat that is generated is not constant with respect to time but varies in response to the demands upon the computer.

Although a single embodiment of apparatus is described and illustrated in FIG. 2, it is contemplated that any of a variety of equipment could be substituted therefor in the practice of this invention. Thus, for example, fuel cells operating at an elevated temperature and generating heat by the electrochemical reaction therein could be used in a similar arrangement. It will be appreciated that the same principles apply if mechanical devices generating or releasing heat due to the compression of a fluid or mechanical friction were substituted. These examples are illustrative of apparatus that might be installed by one skilled in the art and all presumably operate at a temperature higher than the environment external to the wall 12. It is also contemplated that the apparatus 14 could include a device or portion of device operating at a temperature which is below the temperature of the environment external to the wall 12. Thus, for example, it could include the cold portion of a conventional refrigeration system or a thermo-electric generator or some other low temperature device that might be selected by one skilled in the art. Thus, although the apparatus 14 may be at a temperature higher or lower than the environment external to the wall 12, for the purposes of exposition the system of FIG. 2 is considered to involve a temperature regulated electronic computer that is at a higher temperature than its environment, whereby the direction of heat flow is from the computer 14 through the insulating material 13 and the walls 11 and 12 to the environment. In such an arrangement heat is continually generated in the apparatus 14 and the temperature of the apparatus is controlled by a selective bidirectional variation of thermal conductance of the insulating material. If the temperature of the computer 14 is too great the thermal conductance of the insulation 13 is increased and consequently the rate of heat flow from the computer is increased. If the temperature of the computer is too low the thermal conductance of the insulation is decreased, hence decreasing the rate of heat flow to the environment.

A temperature sensitive pressure regulating valve 16 is provided in the heat transfer system as a means for sensing temperature of the apparatus and varying the thermal conductance of the insulating material by regulating the pressure of the gas in the insulation in response to the temperature. The temperature responsive pressure regulating valve 16 is illustrated in greater detail in FIG. 3. In both figures like reference numerals refer to like parts. The valve and its parts are of circular cross section. This valve has a first chamber 17 and a second chamber 18 defined by a first body portion or housing 19, a second body portion or housing 20 and a resilient diaphragm 21 therebetween. The two body portions of the housing are secured together by means of a number of bolts 22 around the periphery of the circular valve housing. The diaphragm 21 extends beyond the bolt circle on the housing and provides a gas seal between the two body portions of the valve and the environment of the valve.

The first chamber of the valve communicates with the insulating material 13 by way of a poppet valve bore and a conduit 23. A poppet valve 24 is mounted in the bore between the first chamber and a source of higher pressure helium gas 27. The poppet valve in its normal closed position has a conical portion 25 which seats against a mating conical portion of the first body portion 19 to form a seal between the first chamber and the pressurized helium gas. An orifice bearing 26 is provided in the first body portion of the valve as a guide for the poppet valve 24. This orifice bearing includes a path of small cross-sectional area for gas to flow between the first chamber and the conduit 23. In the illustrated embodiment the source of higher pressure gas 27 (FIG. 2) is a container of compressed helium but it will be readily appreciated that any conventional source such as a compressor, the vapor over a liquid or solid, or in some instances the atmosphere at one atmosphere pressure can also be used as a source of higher pressure gas.

A conduit 28 connects the poppet valve 24 with the source of higher pressure gas appropriately regulated by a pressure regulating valve 29. A snap ring 31 secures the orifice bearing 26 in the first body portion of the valve. A small spring 32 between a snap ring 33 and the orifice bearing urges the poppet valve into a closed position with its conical portion 25 seated against the mating portion of the valve housing. The orifice bearing 26 constricts the passage between the conduit 23 and the first chamber so that pressure buildup can occur in the insulation when the poppet valve is opened before the buildup occurs in the first chamber. This constriction in the passage of gas between the insulating material and the first chamber also reduces the rate at which gas is withdrawn from the insulation when the valve operates as hereinafter described.

The resilient diaphragm 21 between the first and second chambers is provided with a rigid central hub 34, having a self relieving orifice 35 which communicates with and provides a means for gas flow between the first chamber 17 and the second chamber 18. A pad of resilient material 36 is secured to the end of the poppet valve stem 24 to provide a gas seal between the first chamber and the orifice 35. The orifice 35 and the sealing pad 36 serve as a valve between the first chamber and the second chamber. In order to operate the illustrated system a sump of lower pressure gas or vacuum 38 is provided. This sump may be either the hard vacuum of outer space or some conventional type of vacuum pump or evacuated container. This vacuum is in communication with the second chamber 18 of the valve 16 by means of a conduit 39.

A spring 41 is provided pressing against the rigid center hub 34 on the diaphragm and abutting against an adjustable cap 42 that is threaded onto the second body portion 20 of the valve housing. By means of the threaded attachment of the cap 42 to the housing 20, adjustment of the force on the diaphragm can be obtained. A seal 43 is provided between the adjustable cap 42 and the housing 20 of the valving.

Threaded into the cap 42 is a temperature actuated change of state device 44. The temperature actuated change of state device contains an active medium 45 that is sealed into the power device by a resilient membrane 46. The active medium comprises a material which undergoes a melting reaction at a particular temperature. In this embodiment the active medium 45 is 75% paraffin wax and 25% petrolatum having a melting point of 121° F. When the active medium melts there is a concomitant increase in volume which is large relative to the normal thermal expansion of the active medium. This volume change forces the resilient membrane 46 outward so as to press against a plunger 47 of a relatively small cross-sectional area, thus providing a large displacement of the plunger 47. Further details of temperature actuated change of state devices suitable for use in the illustrated embodiment are described in U.S. Patent 2,938,384 to E. M. Soreng et al. for a "Temperature Actuated Power Device" and in U.S. Patent 2,636,776 to S. Vernet for a "Pressure Operated Device." A temperature actuated change of state device of the type described is preferred for use in this invention because of the large displacement that is obtained over a very short temperature range compared with the displacement that is obtained over relatively broad adjoining temperature ranges. However, it should be readily appreciated by one skilled in the art that other displacement producing thermally actuated devices may be substituted in other embodiments of temperature sensitive pressure regulating valves. Thermal actuators such as bimetallic elements or expanding gases are contemplated in the practice of this invention although of less satisfactory operating characteristics than the preferred temperature actuated change of state device.

It is also contemplated that a combination of temperature actuated change of state devices and bimetallic elements or similar thermal actuators may be employed in the practice of this invention. Thus, for example, a combination of two temperature actuated change of state devices and a bimetallic element could be arranged to provide a large degree of expansion at two discrete temperatures and a continuous variation of expansion between the two temperatures. Substitution of combination thermal actuators in other embodiments of pressure regulating means can be made by those skilled in the art.

A spring 48 is provided between the plunger 47 and the rigid center hub 34 on the diaphragm in order to apply the motion of the plunger as a force against the diaphragm. The spring 48 also provides a restoring force to the plunger 47 upon solidification and contraction of the active medium 45. When the temperature actuated change of state device increases to a temperature where melting of the active medium 45 occurs, the plunger 47 is pressed toward the diaphragm. This motion, as transmitted by the spring 48, biases the diaphragm toward the first chamber 17. Conversely solidification and contraction of the active medium 45 reduces the bias on the diaphragm. The active medium 45 is arranged in good heat transfer relationship to the electronic computer 14, the temperature of which it is desired to control.

In the practice of this invention as revealed in the preferred illustrated and described embodiment, the temperature of an electronic computer 14 is controlled by a closed loop temperature controlling system. Heat is generated in the electronic computer which operates at a temperature above the temperature of the environment. The computer is isolated from the environment by a body of insulating material 13, the thermal conductance of which is variable in response to the pressure of a gas in the insulating material. The quantity of heat flowing from the electronic computer to the environment through the body of insulating material is determined by the thermal conductance of the insulating material. Pressure control of the gas in the insulating material is provided by a temperature-sensitive pressure-sensitive regulating valve. When the temperature of the computer rises above 121° F., a value linked to the melting point of the active medium in the valve, the pressure of the gas in the insulation is increased by a closed loop control more fully described hereinafter. Increase in the pressure of the gas increases the thermal conductance which increases the rate of heat flow from the computer to the environment. Increase in rate of heat flow decreases the temperature of the computer to restore the sensed temperature to its desired equilibrium value.

When the temperature of the computer decreases the pressure of the gas in the insulating material is decreased which reduces the thermal conductance of the insulating material to effect reduction of the rate of heat flow from the electronic computer to the environment and conservation of the heat generated in the electronic computer whereby a rise in the temperature occurs to retain or restore the temperature to its desired equilibrium range.

In the condition when the electronic computer 14 is in its optimum temperature range, the valve 16 is in its equilibrium condition with both the poppet valve 24 and the self relieving orifice 35 closed. That is, the conical portion 25 of the poppet valve is in sealing relation to the mating portion of the housing 19 of the valve and the self relieving orifice 35 is in sealing relation to the resilient pad 36. The pressure of the gas in the insulation 13 and in the first chamber 17 is equal. The pressure differential across the diaphragm 21 between the first and second chambers urges the diaphragm toward the evacuated second chamber and the force is exactly balanced by the urging forces of the springs 41 and 48. The poppet valve 24 is held closed by the force of the spring 32.

When the pressure of the gas in the insulation and in the first chamber increases above a predetermined value, which value can be adjusted by means of the screw cap 42, the diaphragm is displaced toward the second chamber 18 and the self relieving orifice is no longer in sealing relation to the resilient pad 36 which is secured to the poppet valve stem 24. When the self relieving orifice is thus opened the gas in the first chamber is free to pass to the second evacuated chamber, hence lowering the pressure of the gas in the insulation. The orifice bearing 24 restricts the flow of gas from the insulation so that an excessive quality of gas is not removed from the insulation in the pressure lowering operation thereby conserving the pressurizing gas. When the pressure in the first chamber of the valve and hence in the insulation decreases to a value that is insufficient to sustain the displacement of the diaphragm against the force of the springs, the diaphragm returns to its equilibrium position and the orifice 35 is closed against the resilient pad. The pressure of the gas in the insulation becomes static and the valve is again in its equilibrium condition.

When the regulated pressure of the gas in the first chamber 17 and in the insulation drops to a value where the urging force of the springs 41 and 48 overcomes the force of pressure differential across the diaphragm and the force of the spring 32, displacement of the diaphragm and its rigid center hub will occur. This displacement compresses the spring 32 and moves the poppet valve 24 so that the conical portion 25 is no longer seated against the housing and gas is free to flow from the conduit 28 to the insulation by way of the conduit 23. As the pressure of the gas in the insulation and the first chamber increases the force against the diaphragm increases, counterbalancing the force of springs 41 and 48 restoring the diaphragm to its equilibrium position and closing the poppet valve 24.

In the described embodiment when the temperature of the electronic computer 14 increases to a value higher than the melting point of the active medium 45 in the temperature actuated change of state device 44, this medium will melt and thereby expand in volume and force the plunger 47 in a direction toward the diaphragm. This motion on one end of the spring 48 results in an increased force against the diaphragm thereby biasing the equilibrium position of the diaphragm in such a direction that an increased pressure is required in the first chamber and hence in the insulation to restore the diaphragm to its equilibrium position. That is to say, the total urging force on the diaphragm from the two springs 41 and 48 must be offset by an increased pressure in the first chamber 17 in order to keep the poppet valve 24 and the self relieving orifice 35 closed. When melting occurs in the active medium and the force against the diaphragm is increased, displacement occurs in the diaphragm, which presses the poppet valve 24 so as to compress the spring 32 and open the poppet valve, thereby allowing higher pressure gas to enter the first chamber 17 and the insulation. This increased pressure in turn acts to counterbalance the urging force of the springs and press the diaphragm toward the second chamber allowing the spring 32 to close the poppet valve. Thus, a new equilibrium pressure exists in the pressure regulating valve and the insulation which is greater than the equilibrium pressure when the active medium is solid.

Increased pressure of the gas in the insulation increases the thermal conductance of the insulating material which results in an increased rate of heat flow through the body of insulating material. Thus through the chain of operative interconnections the rate of heat flow is responsive to the sensing of temperature of the apparatus in the system. In the described embodiment when the heat flow from the apparatus to the environment is small, the temperature of the electronic computer as sensed by the temperature actuated change of state device will tend to increase. When the temperature increases to a value where the temperature sensitive medium in the temperature actuated change of state device melts, the temperature bias on the diaphragm is increased and the valve is actuated to increase the pressure of the gas in the insulation and, therefore, the rate of heat flow.

Conversely upon solidification of the active medium the plunger of the temperature actuated change of state device retracts under the urging force of the pressure differential across the diaphragm as transmitted by spring 48. The force of the spring 48 against the diaphragm is decreased by the retraction of the plunger thereby allowing the diaphragm to move toward the second chamber under the pressing of the pressure differential between the first chamber and the second chamber. When the diaphragm moves toward the second chamber the self relieving orifice in the rigid center hub moves away from the resilient sealing pad on the poppet valve stem thereby opening this means for valving and allowing gas to flow from the first chamber of the valve to the sump of lower pressure gas or vacuum. This in turn removes gas from the insulation through the orifice bearing 26 and the conduit 23. When the pressure in the first chamber has decreased a sufficient amount, the force on the diaphragm due to the pressure differential between the first chamber and the second chamber is decreased and the urging forces of the springs 41 and 48 returns the diaphragm to its equilibrium position with both the poppet valve and the self relieving orifice closed. The decrease in pressure of the gas in the insulation material decreases the thermal conductance of the body of insulating material and reduces the rate of heat flow between the apparatus and the environment. Continued heat generation by operation of the electronic computer will once again be in balance with heat loss to the environment and the temperature of the computer remains constant.

FIG. 4 shows a second embodiment of an adjustable cap 142 for the valve 16. This cap can be substituted for the cap 42 in the embodiment discussed and illustrated in FIGS. 2 and 3. The cap 142 differs from the cap 42 in that the temperature actuated change of state device incorporated in the cap contracts upon increasing temperature so that the temperature regulating system previously described can operate in a manner in some respects opposite to the manner above described. This latter type of operation is employed when the temperature of the apparatus in a system of the type described and illustrated in FIG. 2 is to be maintained lower than that of its environment and heat is extracted from the apparatus by other means than through the thermal insulation. In this type of operation it is therefore desired to control the quantity of heat flowing from the environment through the insulation material to the apparatus in the system.

The cap 142 is so constructed and arranged that it can replace the cap 42 previously described. The difference from the cap 42 lies in the internal construction of a temperature actuated change of state device 144 which is threaded into the cap. This differs from the change of state device 44 in the cap 42. The temperature actuated change of state device 144 comprises first and second housing portions 150 and 151 secured together by a number of bolts 152. A plug 153 is threaded into the second portion of the housing. The interior of the temperature actuated change of state device is divided into two chambers by a resilient membrane 146. One of these chambers contains an active medium 145 which is of the same type as the active medium 45 in the above described embodiment. A plunger 147 passes through the first housing portion 150 of the temperature actuated change of state device, and through an axial hole in the active medium. The plunger has an extending shoulder 154 facing against the opposite side of the membrane 146 than the active medium. A compression spring 155 is between the shoulder of the plunger and the plug 153 in the housing of the change of state device. A seal 156 is provided between the plunger and the first portion housing. The resilient membrane 146 is a flat circular piece with an axial hole having a shoulder 157 raised above the surface of the flat portion around the edge of the axial hole. The inner portion of this raised shoulder 157 presses against the plunger 147 to provide a seal to prevent the active medium from escaping from its confinement, thereby preventing the resilient membrane from slipping relative to the shoulder 154 during movement of the plunger 147.

This second embodiment of a temperature actuated change of state device operates to contract upon increasing temperature. When the temperature of the power device increases above the melting point of the active medium, this medium melts and increases substantially in volume, thereby displacing the resilient membrane and hence the shoulder of the plunger, forcing the plunger in a direction to compress the spring 155 and decreasing the overall length of the temperature actuated change of state device. Conversely decrease in the temperature of the power device below the melting point of the active medium causes solidification of the medium with a consequent decrease in volume. The compressed spring 155 presses the plunger against the resilient membrane and the active medium and upon decrease in volume of the active medium causes a motion of the plunger so as to increase the overall length of the temperature actuated change of state device.

When the cap 142 and its associated change of state device 144 is used in place of the cap 42 with its change of state device 44 in the temperature sensitive pressure regulating valve 16, the operation of the valve portion is substantially the same as previously described. When the cap 142 is used and the temperature increases above the melting point of the active medium the plunger 147 moves away from the diaphragm 21 and the pressure in the first chamber 17 and hence in the insulation is decreased in a manner as has been described previously. Thus the difference in operation when the second described cap 142 is substituted for the first cap 42 is that the pressure in the first chamber and hence in the insulation is decreased upon an increase of the temperature sensed by the temperature actuated change of state device and that the pressure of the gas is increased upon a decrease of the temperature sensed by the change of state device. The operation of the balance of the system described and illustrated in FIG. 2 is similar when the cap 142 is used on the valve 16.

The specific embodiments of the invention as described above illustrate the practice of the method described and provide a means for practicing the invention. It is, however, intended to be an exemplary embodiment of but one of several forms which may be selected by those skilled in the art to practice the principles of this invention.

It is sometimes desirable to employ a heat flow system involving bi-directionally variable thermal conductance wherein the system is even simpler in design and operation than the illustrated embodiment. Thus, for example, when intermittent or infrequent change in thermal conductance is sufficient to supply the heat flow control, manual or simplified automatic control means can be used to replace the fully automatic operation of the preferred embodiment. Thus, there is illustrated in FIG. 5 a heat flow control system embodying the principles of this invention wherein the thermal conductance of an insulating material is varied in either of two opposite senses by varying the composition of gas permeating a solid substance. A manually controlled system is illustrated having but two readily available values of thermal conductance. This embodiment is suited for temperature control of an electronic computer 55 that is located in heat transfer relationship with a tank 56 which is adapted to contain cryogenic fluids. A body of thermal insulation 57 interposed between the computer and the tank is connected to a sump of low pressure gas or vacuum 58 by a conduit 59 which includes a valve 60. A conduit 61 connects a source of nitrogen 62 and a source of helium 63 to the body of insulating material. This conduit includes valves 64 and 65 which are between the insulation and the nitrogen and helium sources respectively. The body of insulation material 57 is a sealed, gas-filled permeable substance comprising glass fibers of the same type as has been previously described in the embodiment illustrated in FIG. 2.

The computer operates at times when the tank is empty of cryogenic fluid and at ambient temperature and also operates when the tank contains low temperature fluids. During the operation of the computer heat is generated and must be dissipated to the environment which includes the tank 56. Thus, at least a portion of the heat generated in the computer is transferred to the tank through the body of insulation 57. The amount of heat transferred from the computer to the tank through the body of insulating material is dependent on the thermal conductance of the insulating material and the temperature gradient across the insulating material. When the tank is at ambient temperatures a relatively low temperature gradient exists across the body of insulating material and when the tank contains cryogenic liquids a relatively large temperature gradient exists between the computer and the tank. In order to maintain the temperature of the computer at substantially the same value when the tank is filled as when the tank is empty and at ambient temperatures, it is desirable to vary the thermal conductance of the insulating material, having a high thermal conductance when the temperature gradient is low and a low thermal conductance when the temperature gradient is high.

As has been stated previously the thermal conductance of a gas-filled permeable insulating material is dependent, among other parameters, on the composition of the gas amid the permeable material. This variation in thermal conductance is exemplified in Table 1 wherein the thermal conductance of the glass fiber matrix described above is tabulated for a variety of temperatures when the gas amid the glass fibers is helium or nitrogen at atmospheric pressure.

*Table I.—Thermal conductance of gas-filled thermal insulation*

| Mean Insulation Temperature, °F. | Thermal Conductance, B.t.u.-in./hr.-ft.²/° F. | |
|---|---|---|
| | Helium | Nitrogen |
| −200 | 0.73 | 0.12 |
| 0 | 1.02 | 0.21 |
| 100 | 1.16 | 0.24 |

It can be seen from the table that the thermal conductance of the insulating material is approximately five times as high for a helium permeated material as it is for a nitrogen permeated material at the same temperature. Thus, when a high rate of heat flow is desired, helium is used as the gas in the insulating material and when a low heat transfer rate is desired nitrogen is used as the gas in the insulating material. In using this system with cryogenic fluids, an additional gain is made in the thermal conductance change over single temperature operation. Thus, when the system as a whole is at ambient temperatures, the mean temperature of the body of thermal insulation is in the order of 100° F. wherein the helium permeated insulation has a thermal conductance of 1.16 B.t.u.-in./hr.-ft.²-° F. When the tank contains liquid hydrogen, for example, the mean temperature of the insulation is in the order of −200° F. and the thermal conductance of nitrogen permeated insulation is 0.12 B.t.u.-in./hr.-ft.²-° F., nearly a tenfold decrease in thermal conductance.

In the embodiment illustrated in FIG. 5 when the tank 56 is at ambient temperatures helium is admitted to the permeable insulating material to establish a relatively high heat transfer rate so as to maintain the computer within its proper operating temperature range. When cryogenic fluids are admitted to the tank the valve 65 to the helium is closed and the valve 64 to the nitrogen opened. Opening of the valve 60 to the vacuum removes the helium from the permeable insulating substance and allows replacement by nitrogen from the source 62. The nitrogen permeated insulating material has a much lower thermal conductance at the cryogenic temperatures than the helium permeated insulating material has at ambient temperature. Hence, despite the increased temperature gradient across the insulating material, the quantity of heat flowing from the electronic computer is substantially unchanged and its temperature remains substantially unchanged. When the tank is emptied of cryogenic fluid and its temperature rises again to ambient, the thermal conductance of the insulation is increased by reversing the operation of replacing the helium with nitrogen. The valve 64 to the nitrogen is closed, valve 65 to the helium supply is opened and the nitrogen is drawn off the insulation 57 by the conduit 59. The thermal conductance of the insulating material is restored to its original value, the heat flow is increased and the temperature of the computer remains stable.

In the embodiment illustrated in FIG. 5 the source of nitrogen, helium and vacuum are conventional types as can be readily supplied by one skilled in the art. With suitable pressures in the nitrogen and helium supplies, the vacuum can be dispensed with and the replaced gas merely vented at atmospheric pressure. The valves 60, 64 and 65 are manual fluid control valves, however, metering valves to give intermediate compositions of gas rather than pure nitrogen or helium could easily be employed. It is also contemplated and will be readily appreciated by one skilled in the art that the operation of these valves can be mechanized and their actuation controlled by means of automatic equipment which may in turn be actuated by any of a variety of sensed quantities such as, for example, elapsed time, temperature of the tank or liquid level in the tank. It is also contemplated that the operation of the two illustrated embodiments be combined to provide both composition and pressure control of the thermal conductance in a single apparatus.

It will be readily appreciated that the disclosed invention provides a method for regulating heat flow. Additionally it provides a method for controlling temperature. It also provides a means for controlling heat flow and temperature and a means for regulating pressure in response to temperature.

Obviously many modifications and variations of the present invention are possible in light of the above teachings. It is therefore to be understood that within the scope of the appended claims the invention may be practiced otherwise than as specifically described.

What is claimed is:

1. A temperature regulating system comprising:
   a first region having a first temperature,
   a second region having a second temperature,
   a body of permeable insulating material bounded by a fluid impermeable wall interposed between the first region and the second region,
   a source of higher pressure gas,
   a first means including a valve for providing communication between the higher pressure gas and the insulating material,
   a sump of lower pressure gas,
   a second means including a valve for providing communication between the lower pressure gas and the insulating material,
   pressure responsive means including a resilient diaphragm for actuating each of said valves, and
   temperature responsive means including a temperature actuated change of state device for biasing the pressure responsive means.

2. A temperature controlled system comprising:
   an insulator of permeable material,
   a gas confined by an impermeable wall so as to permeate the permeable material,
   a valve housing,
   a resilient diaphragm dividing the housing into first and second sealed chambers, said diaphragm having an orifice providing fluid communication between said first and second chambers,
   a first conduit in the valve housing in fluid communication with the first chamber,
   a source of high pressure gas in communication with the conduit,
   a poppet valve in the conduit,
   a second conduit in the valve housing in fluid communication with the gas amid the permeable material and with the first chamber,
   a poppet valve stem secured to the poppet valve and having an end portion thereof in sealing engagement with the orifice in said diaphragm,
   a source of low pressure,
   a third conduit providing fluid communication between the second chamber and the source of low pressure,
   a temperature sensitive expansible change of state device mounted on the housing,
   a first compressed spring interposed between said change of state device and the side of the said diaphragm facing the second chamber,
   a second compressed spring in the second chamber interposed between the housing and the diaphragm, and a third spring in the first chamber interposed between the housing and the poppet valve stem to urge said poppet valve and valve stem end into position wherein said poppet valve and diaphragm orifice are closed.

3. An apparatus for regulating heat flow comprising:
a confined body of gas permeated permeable insulating material,
a source of pressurized gas,
a sump of low pressure gas,
a valve housing including a resilient diaphragm,
thermally actuated means for biasing the diaphragm,
means including a first valve for providing fluid communication between the source of pressurized gas and the insulating material,
means including a second valve for providing fluid communication between the sump of low pressure gas and the insulating material,
means for providing fluid communication between the insulating material and one side of said diaphragm,
means connected with the diaphragm for opening the first valve when the diaphragm is displaced in a first direction, and
means connected with the diaphragm for opening the second valve when the diaphragm is displaced in a second direction.

4. A method for regulating heat flow comprising the steps of interposing a gas permeated permeable insulating material between a region having relatively high temperature and a region having relatively low temperature,
transferring heat from the region having relatively high temperature to the insulating material,
transferring heat from the insulating material to the region of relatively low temperature,
sensing a quantity having a known relation to the amount of heat transferred in one of said transferring steps, and
varying the composition of the gas permeating the insulating material in response to the sensed quantity.

5. An apparatus for regulating heat flow comprising:
a body of gas-permeated permeable insulating material bounded by a gas impermeable wall,
a source of pressurized gas,
a sump of low pressure gas,
means including a first valve for providing fluid communication between the source of pressurized gas and the insulating material,
means including a second valve for providing fluid communication between the sump of low pressure gas and the insulating material,
thermally actuated means for opening either of said valves in exclusion of the other of said valves and pressure actuated means for opening either of said valves in exclusion of the other of said valves.

6. A method for regulating temperature in an apparatus comprising the steps of:
interposing a permeable insulating material between an apparatus having a first temperature and a region having a second temperature;
changing the quantity of heat in the apparatus in a sense to increase the difference between the temperature in the apparatus and the second temperature;
transferring heat between the apparatus and the region at the second temperature through the insulating material;
sensing said first temperature;
permeating the permeable material with a gas; and
varying the composition of the gas in response to the sensed temperature.

7. Means for controlling temperature in a compartment comprising:
a compartment;
a body of permeable insulating material between said compartment and its surroundings;
a gas having a first composition confined so as to permeate the permeable material; and
means for replacing at least part of said gas having a first composition with a gas having a second composition, said gas having a first composition having a thermal conductance different from the thermal conductance of said gas having a second composition.

8. A method for regulating temperature in an apparatus comprising the steps of:
interposing a gas permeated permeable insulating material between an apparatus having a first temperature and a region having a second temperature;
changing the quantity of heat in the apparatus in a sense to increase the difference between the temperature in the apparatus and the second temperature;
transferring heat between the apparatus and the region at the second temperature through the insulating material;
sensing said first temperature;
controlling a valve in response to said first temperature;
varying the partial pressure of a first gas in said permeable insulating material by means of said valve; and
replacing said first gas with a second gas having a different thermal conductance from said first gas and maintaining the total pressure in said permeable insulating material at a substantially constant value.

References Cited by the Examiner

UNITED STATES PATENTS

| | | | |
|---|---|---|---|
| 1,909,495 | 5/1933 | Maneib | 236—92 |
| 2,109,169 | 2/1938 | Field | 165—96 |
| 2,212,285 | 8/1940 | Ayres | 236—92 |
| 2,513,749 | 7/1950 | Schilling | 62—45 |
| 2,598,351 | 5/1952 | Carter | 73—358 |
| 2,863,297 | 12/1958 | Johnson | 62—45 |
| 2,890,866 | 6/1959 | Hansen | 165—96 |
| 2,910,276 | 10/1959 | Escher | 165—96 |
| 3,105,148 | 9/1963 | Monaghan et al. | 62—45 |

ROBERT A. O'LEARY, *Primary Examiner.*

CHARLES SUKALO, *Examiner.*

S. W. MILLARD, *Assistant Examiner.*